US011555280B2

(12) United States Patent
Su et al.

(10) Patent No.: US 11,555,280 B2
(45) Date of Patent: *Jan. 17, 2023

(54) SOUND ABSORBING STRUCTURE HAVING ONE OR MORE ACOUSTIC SCATTERERS FOR IMPROVED SOUND TRANSMISSION LOSS

(71) Applicant: Toyota Motor Engineering & Manufacturing North America, Inc., Plano, TX (US)

(72) Inventors: Xiaoshi Su, Ann Arbor, MI (US); Debasish Banerjee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/036,778

(22) Filed: Sep. 29, 2020

(65) Prior Publication Data

US 2022/0098806 A1    Mar. 31, 2022

(51) Int. Cl.
*E01F 8/00* (2006.01)
*E04B 1/84* (2006.01)
(Continued)

(52) U.S. Cl.
CPC .............. *E01F 8/0023* (2013.01); *B64F 1/26* (2013.01); *E01F 8/0047* (2013.01)

(58) Field of Classification Search
CPC ....... E01F 8/0023; E01F 8/0047; E01F 8/005; E01F 8/0035; E01F 8/0094; E01F 8/00;
(Continued)

(56) References Cited

U.S. PATENT DOCUMENTS 2,840,179 A * 6/1958 Junger .................. E04B 1/8409
181/286
3,783,968 A * 1/1974 Derry .................... E01F 8/0052
D25/160
(Continued)

FOREIGN PATENT DOCUMENTS

CN       106205590 A  * 12/2016   ............... E04B 1/84
CN       107245963 A  * 10/2017   ............... E01F 8/00
(Continued)

OTHER PUBLICATIONS

Long et al., "Multiband quasi-perfect low-frequency sound absorber based on double-channel Mie resonator," Appl. Phys. Lett. 112, 033507, 7 pages (2018).

(Continued)

*Primary Examiner* — Edgardo San Martin
(74) *Attorney, Agent, or Firm* — Christopher G. Darrow; Darrow Mustafa PC

(57) ABSTRACT

A sound absorbing structure includes a wall having a first side and a second side and at least one acoustic scatterer coupled to a first side of the wall. The first side of the wall may be positioned to face a source of noise, such as moving motor vehicles, airplanes, and the like. The at least one acoustic scatterer has an opening and at least one channel. The at least one channel has a channel open end and a channel terminal end with the channel open end being in fluid communication with the opening.

20 Claims, 8 Drawing Sheets

(51) Int. Cl.
*G10K 11/16* (2006.01)
*B64F 1/26* (2006.01)

(58) Field of Classification Search
CPC . B64F 1/26; E04B 1/84; E04B 1/8409; E04B 2001/8414; E04B 2001/8428; E04B 2001/8433; E04B 2001/8438; E04B 2001/8476; E04B 2001/848; E04B 2001/8485; E04B 2001/849; G10K 11/20; G10K 11/172; G10K 11/02; G10K 11/04; G10K 11/16
See application file for complete search history.

(56) References Cited

U.S. PATENT DOCUMENTS

| | | | | |
|---|---|---|---|---|
| 3,812,931 A * | 5/1974 | Hauskins, Jr. | ........ | E01F 8/0052 181/210 |
| 4,095,669 A * | 6/1978 | Bond, Sr. | ........ | E01F 8/0052 181/210 |
| 4,143,495 A | 3/1979 | Hintz | | |
| 4,899,498 A | 2/1990 | Grieb | | |
| 5,220,535 A * | 6/1993 | Brigham | ........ | G10K 11/172 367/1 |
| 5,329,073 A | 7/1994 | Shono et al. | | |
| 5,426,267 A | 6/1995 | Underhill et al. | | |
| 5,713,170 A | 2/1998 | Elmore et al. | | |
| 6,892,856 B2 * | 5/2005 | Takahashi | ........ | G10K 11/172 181/284 |
| 7,308,965 B2 * | 12/2007 | Sapoval | ........ | E01F 8/0076 181/293 |
| 7,520,370 B2 * | 4/2009 | Gudim | ........ | E04B 1/8209 181/290 |
| 8,157,052 B2 * | 4/2012 | Fujimori | ........ | G10K 11/175 181/295 |
| 8,789,652 B2 * | 7/2014 | Swallowe | ........ | G10K 11/172 181/295 |
| 8,925,678 B2 * | 1/2015 | Tizzoni | ........ | E01F 8/007 181/284 |
| 9,607,600 B2 * | 3/2017 | Swallowe | ........ | G10K 11/172 |
| 10,699,688 B2 * | 6/2020 | Elford | ........ | G10K 11/172 |
| 10,714,070 B1 * | 7/2020 | Su | ........ | G10K 11/175 |
| 11,043,199 B2 * | 6/2021 | Lee | ........ | G10K 11/172 |
| 2013/0199868 A1 | 8/2013 | Bergiadis | | |
| 2020/0284174 A1 * | 9/2020 | Lee | ........ | F28F 3/02 |
| 2021/0010977 A1 * | 1/2021 | Lee | ........ | G01N 29/07 |
| 2021/0142773 A1 * | 5/2021 | Su | ........ | B60R 13/0815 |
| 2021/0142777 A1 * | 5/2021 | Su | ........ | G10K 11/162 |
| 2021/0210061 A1 * | 7/2021 | Su | ........ | G10K 11/172 |
| 2021/0237394 A1 * | 8/2021 | Huang | ........ | B32B 21/08 |
| 2021/0381231 A1 * | 12/2021 | Sheng | ........ | E04B 1/84 |

FOREIGN PATENT DOCUMENTS

| | | | | |
|---|---|---|---|---|
| JP | 62126215 A | * | 6/1987 | |
| JP | 2016009095 A | * | 1/2016 | |
| JP | 6908320 B1 | * | 7/2021 | |
| KR | 100986316 B1 | * | 10/2010 | |
| KR | 101019296 B1 | * | 3/2011 | |
| KR | 101080213 B1 | * | 11/2011 | |
| KR | 101348919 B1 | * | 1/2014 | |
| KR | 102273933 B1 | * | 7/2021 | |
| WO | 199300262 A1 | | 1/1993 | |
| WO | WO-2005049924 A1 | * | 6/2005 | ............ E01F 8/0035 |
| WO | WO-2015141655 A1 | * | 9/2015 | ............... E04B 1/99 |

OTHER PUBLICATIONS

Cheng et al., "Ultra-sparse metasurface for high reflection of low-frequency sound based on artificial Mie resonances," Nat. Mater. 14, 8 pages(2015).

Schwan et al., "Sound absorption and reflection from a resonant metasurface: Homogenisation model with experimental validation," Wave Motion 72, 154-172 (2017).

Ghaffarivardavagh et al., "Ultra-open acoustic metamaterial silencer based on Fano-like interference," Phys. Rev. B 99, 024302, pp. 1-10 (2019).

Lee et al., "Ultrasparse Acoustic Absorbers Enabling Fluid Flow and Visible-Light Controls," Phys. Rev. Applied 11, 024022, pp. 1-13 (2019).

* cited by examiner

SOUND ABSORBING STRUCTURE HAVING ONE OR MORE ACOUSTIC SCATTERERS FOR IMPROVED SOUND TRANSMISSION LOSS

TECHNICAL FIELD

The present disclosure relates to sound absorbing structures and, more specifically, to sound absorbing structures having a wall that includes one or more acoustic scatterers that absorb sound and improve sound transmission loss.

BACKGROUND

The background description provided is to generally present the context of the disclosure. Work of the inventors, to the extent it may be described in this background section, and aspects of the description that may not otherwise qualify as prior art at the time of filing, are neither expressly nor impliedly admitted as prior art against the present technology.

Low-frequency noise-related issues are common in a variety of different environments. For example, noise generated from rapidly moving traffic on a highway, the takeoff and landing of large airplanes at an airport, the movement of rail freight on a railroad, and the like create significant amounts of low-frequency noise. There are several different solutions for managing low-frequency noises, but many have drawbacks. For example, conventional porous sound absorbing materials are only efficient for high-frequency noise reduction due to its high impedance nature. The sound transmission through porous materials is high if the material microstructure has a large porosity.

Additionally, the sound isolation performance using these types of materials is limited by the so-called "mass-law." The "mass-law" states that doubling the mass per unit area increases the sound transmission loss ("STL") by six decibels. Similarly, doubling the frequency increases the STL by six decibels. This effect makes it difficult to isolate low-frequency sound using lightweight materials. In order to achieve high STL, one may either reflect or absorb the sound energy. However, achieving high absorption and high STL at the same time is also difficult because high absorption usually requires impedance matching, which leads to high transmission.

SUMMARY

This section generally summarizes the disclosure and is not a comprehensive disclosure of its full scope or all its features.

Examples of sound absorbing structures are described herein. In one embodiment, a sound absorbing structure includes a wall and at least one acoustic scatterer having a resonant frequency coupled to a side of the wall. The at least one acoustic scatterer has an opening and one or more channels. The one or more channels may have channel open ends and channel terminal ends with the open ends being in fluid communication with the opening. In the case of multiple channels, the additional channels may have a similar shape to each other with the same channel cross-section area and length and the same cavity volume.

In another embodiment, a system includes a sound absorbing structure that has a wall and at least one acoustic scatterer having a resonant frequency that is coupled to a side of the wall. The system includes a surface, wherein the wall generally extends along the length of the surface. The surface may be a surface that generally supports the movement of one or more vehicles, such as a road for automobiles, railroad tracks for trains, a runway for aircraft, and/or a waterway for watercraft. The side of the wall to which the acoustic scatterer is coupled to generally faces the surface that supports the movement of the one or more vehicles. By so doing, the systems can absorb sounds, especially low-frequency sounds, generated by various vehicles located on or near the surface.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The present teachings will become more fully understood from the detailed description and the accompanying drawings, wherein.

The figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DETAILED DESCRIPTION

The present teachings provide a sound absorbing structure that may include an array of acoustic scatterers, which may be referred to as half scatterers, coupled to a wall. This arrangement may achieve high STL beyond the "mass-law" and total acoustic absorption at the same time. The side of the wall having the array of acoustic scatterers may substantially face a source of noise, such as moving vehicles.

The sound absorbing structure described in this disclosure may achieve high sound absorption and yet, at the same time, be relatively thin. Moreover, in one example, the sound absorbing structure may have a thickness of only $1/16$ of the wavelength and can achieve total acoustic absorption. In addition, the sound absorbing structure can essentially break the "mass-law" near the resonant frequency of the acoustic scatterer. At the resonant frequency, the effective mass density of the sound absorbing structure becomes negative so that the sound speed, as well as the wavenumber in the material, becomes imaginary. The imaginary wavenumber indicates that the wave is exponentially decaying in the material. Also, the impedance of the material is matched to air at the same frequency so that there is no reflection. As a result, all the energy may be absorbed, and hence the STL is higher than the mass-law within a certain frequency band.

Moreover, the sound projected to the sound absorbing structure is at least partially reflected by the wall without a phase change. The acoustic scatterer behaves like a monopole source at a certain distance from the wall, and its mirror image radiates a monopole moment as well. The two monopoles form a new plane wave having a direct reflection from the wall with a 180° phase difference. As such, the wave reflected by the wall is essentially canceled out by the new plane wave, thus absorbing the projected sound.

With regards to the design of the sound absorbing structure, the sound absorbing structure may include a wall that has at least one acoustic scatterer attached to the wall. The acoustic scatterer may have a housing that defines two separate channels that each have an open end and a terminal end. The housing of the acoustic scatterer also has an opening that is in fluid communication with the open ends of the channels. The terminal ends of the channels are separate from one another and are not in fluid communication with each other.

Figure 1:
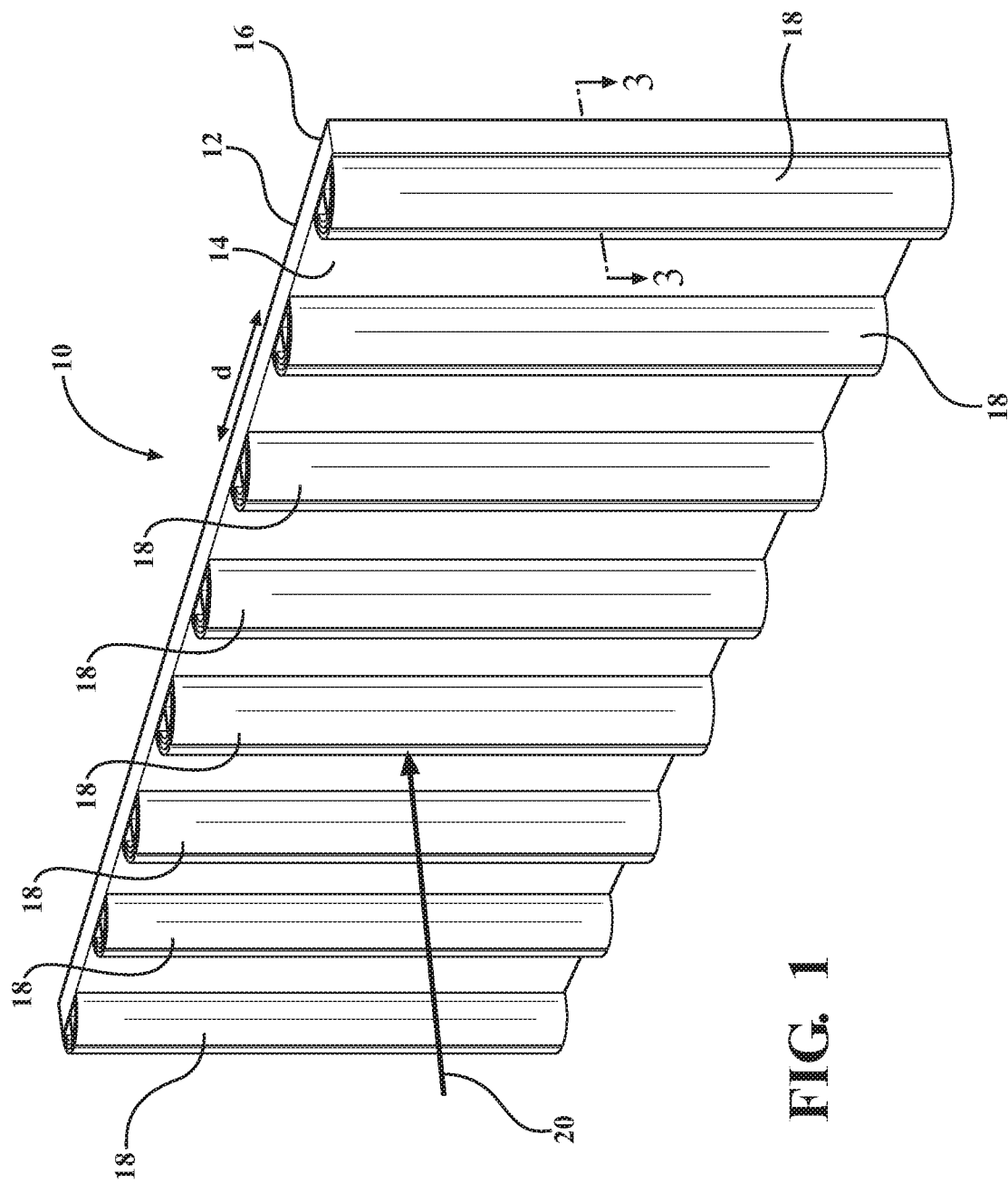
FIG. 1 illustrates a sound absorbing structure for absorbing sound and improving sound transmission loss utilizing an array of acoustic scatterers.

Referring to FIG. 1, a sound absorbing structure 10 is shown. The sound absorbing structure includes a wall 12 having a first side 14 and a second side 16. The wall 12 may be made of an acoustically hard material, such as concrete, metal, glass, wood, plastic, combinations thereof, and the like.

Connected to the first side 14 of the wall 12 are a plurality of acoustic scatterers 18, which may be referred to as half scatterers in this disclosure. The plurality of acoustic scatterers 18 form an array. The acoustic scatterers 18 are separated from each other by a distance of d. It should be understood that the acoustic scatterers 18 and the wall 12 may be a unitary structure or may utilize one of a number of different methodologies to connect the acoustic scatterers 18 to the wall 12. In one example, the acoustic scatterers 18 may be adhered to the wall 12 using an adhesive, but other types of methodologies to connect the acoustic scatterers 18 to the wall 12 may be utilized, such as mechanical devices like screws, bolts, clips, and the like. The acoustic scatterers 18 may be made of an acoustically hard material, such as concrete, metal, glass, wood, plastic, combinations thereof, and the like.

Each of the acoustic scatterers 18 have a resonant frequency. The resonant frequency of each of the acoustic scatterers 18 may be the same resonant frequency or may be different resonant frequencies. Sound absorbed by the sound absorbing structure 10, as will be explained later, substantially matches the resonant frequency of the acoustic scatterers 18. By utilizing acoustic scatterers having different resonant frequencies, a wider range of sounds with different frequencies can be absorbed by the sound absorbing structure 10.

In this example, a total of eight acoustic scatterers 18 are attached to the wall 12. However, it should be understood that any one of a number of different acoustic scatterers 18 may be utilized. In some examples, only one acoustic scatterer 18 may be utilized, while, in other examples, numerous acoustic scatterers 18 may be utilized.

As stated before, projected sound 20, which may also be referred to as a noise, may originate from any one of a number of different sources or combinations thereof. For example, the source of the projected sound 20 may originate from a speaker, vehicle, aircraft, watercraft, train, and the like. Again, it should be understood that the sound absorbing structure 10 can be used in any situation where it is desirable to eliminate or reduce sounds of certain frequencies. The incidence angle of sound waves, such as the projected sound 20, absorbed by the sound absorbing structure varies based on a distance between a plurality of acoustic scatterers.

As stated before, the projected sound 20 is at least partially reflected by the wall 12 without a phase change. The acoustic scatterers 18 behave like a monopole source at a certain distance from the wall 12, and its mirror image radiates a monopole moment as well. The two monopoles form a new plane wave having a direct reflection from the wall with a 180° phase difference. As such, the wave reflected by the wall 12 is essentially canceled out by the new plane wave, thus absorbing the projected sound.

Figure 2B:
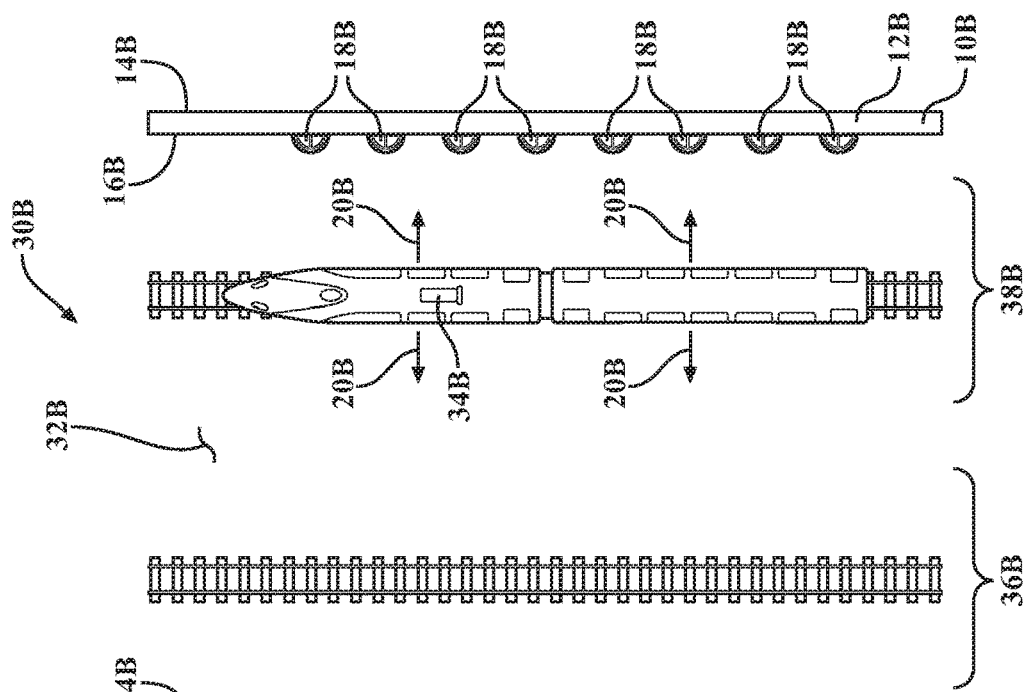
FIGS. 2A-2D illustrate the sound absorbing structure of FIG. 1 used in a variety of different environments, such as a highway environment, railroad environment, airport environment, and waterway environment, respectively.
Figure 2A:
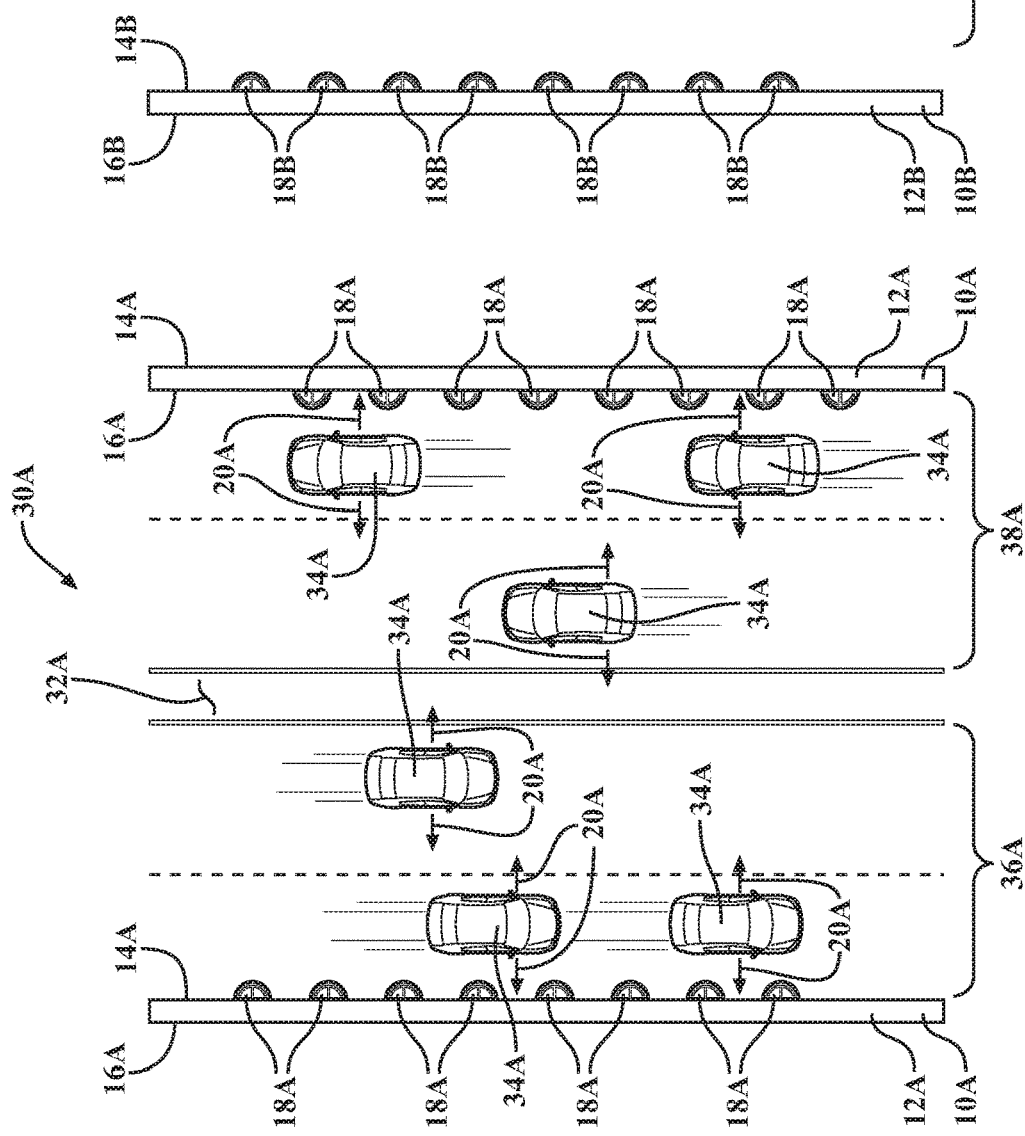

Referring to FIGS. 2A-2D, sound absorbing structures 10A-10D are shown being utilized in a number of different environments, respectively. With reference to FIG. 2A, shown is a system 30A having a sound absorbing structure 10A. For convenience, like reference numerals have been utilized to refer to like elements, and the prior description of these elements can be applied to these elements as well. Moreover, the system 30A includes a surface 32A that may include one or more roads 36A and/or 38A. In this example, the roads 36A and/or 38A may be in the form of two separate two-lane highways. However, it should be understood that the roads 36A and/or 38A may take any one of a number of different configurations, such as having more or fewer lanes.

In this example, the roads 36A and/or 38A are used for the transportation of automobiles 34A. An automobile 34A should be interpreted broadly and can be any type of land-based vehicle capable of moving persons or items from one location to another by utilizing the roads 36A and/or 38A. As such, the automobile 34A could be a common wheeled vehicle, such as a sedan, sport utility vehicle, bus, but could also include other types of vehicles such as farm equipment, mining vehicles, military vehicles, tracked vehicles, and the like.

The automobiles 34A may generate sound 20A that may be directed to the one or more sound absorbing structures 10A. In this example, the surface 32A is located between two sound absorbing structures 10A that may generally oppose one another. However, it should be understood that any one of a number of different types of sound absorbing structures 10A could be utilized. As such, only one sound absorbing structure 10A could be utilized or more sound absorbing structures 10A could be utilized.

Generally, the sound absorbing structures 10A are located adjacent to the surface 32A, such that the walls 12A of the sound absorbing structures 10A generally extend along the length of the surface 32A. As such, in this example, the length of the walls 12A of the sound absorbing structures 10A generally run parallel to the direction of the roads 36A and/or 38A. The first sides 16A of the sound absorbing structures 10A generally faced toward the surface 32A such that the array of acoustic scatterers 18A are located towards the surface 32A. However, in an alternative example, the first sides 16A of the sound absorbing structures 10A may face away from the surface 32A.

As such, in the example shown in FIG. 2A, certain frequencies of sounds 20A generated by the automobiles 34A can be absorbed by the sound absorbing structures 10A. Generally, sounds generated by automobiles 34A are low-frequency sounds and are well-suited to be absorbed by the sound absorbing structures 10A.

Figures 2C, 2D:
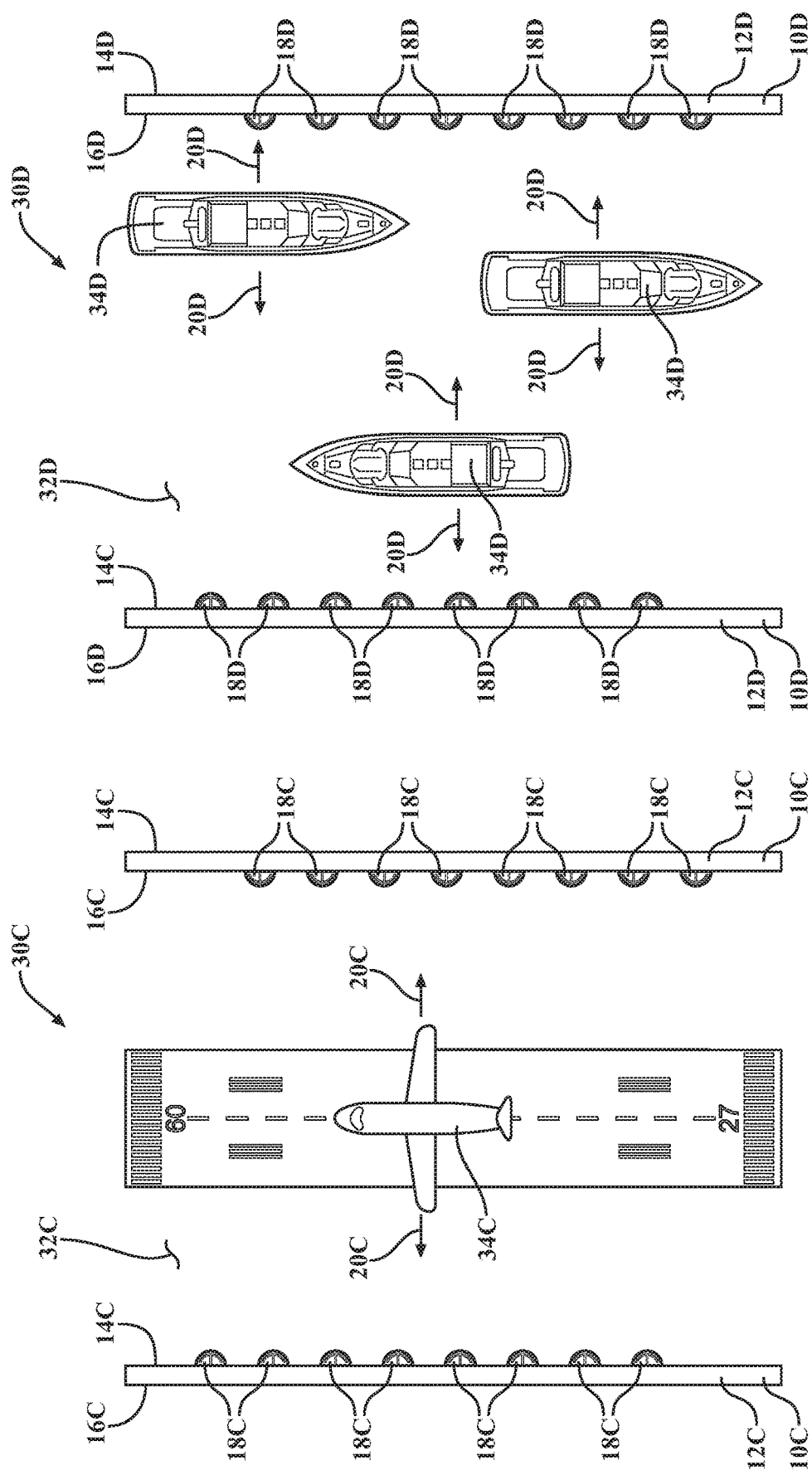

Other examples where the sound absorbing structure 10 of FIG. 1 can be utilized are shown in FIGS. 2B-2D. Like before, like reference numerals have been utilized to refer to like elements, and the prior description of these elements can be applied to these elements as well. For example, referring to FIG. 2B, this figure illustrates a system 30B that includes a surface 32B that has one or more train tracks 36B and/or 38B that allow the movement of rail traffic, such as the train 34B. Here, the train 34B generates sound 20B that is directed towards the sound absorbing structures 10B.

FIG. 2C illustrates an example of a system 30C wherein the surface 32C includes a runway 36C for the takeoff and landing of one or more aircraft, such as aircraft 34C. In this example, the aircraft 34C is in the form of an airplane, but other types of aircraft, such as helicopters, drones, and the like, could be considered as well. Here, the sound absorbing structures 10C absorb sounds 20C generated by the aircraft 34C when taking off or landing from the runway 36C.

FIG. 2D illustrates another example of a system 30D, wherein the surface 32D includes one or more waterways 36D and/or 38D that allow for the travel of one or more watercraft, such as vessels 34D. In this example, sounds 20D generated by the vessels 34D are absorbed by the sound absorbing structures 10D when the vessels 34D are located in the waterways 36D and/or 38D.

The movement of different vehicles, such as automobiles, trains, aircraft, and/or watercraft, have been observed to generate low-frequency noise. These low-frequency noises are particularly suited for absorption by the sound absorbing structure 10. As such, noise generated by the movement of these vehicles can be reduced so as to prevent noise pollution in areas where these vehicles operate.

Figure 3A:
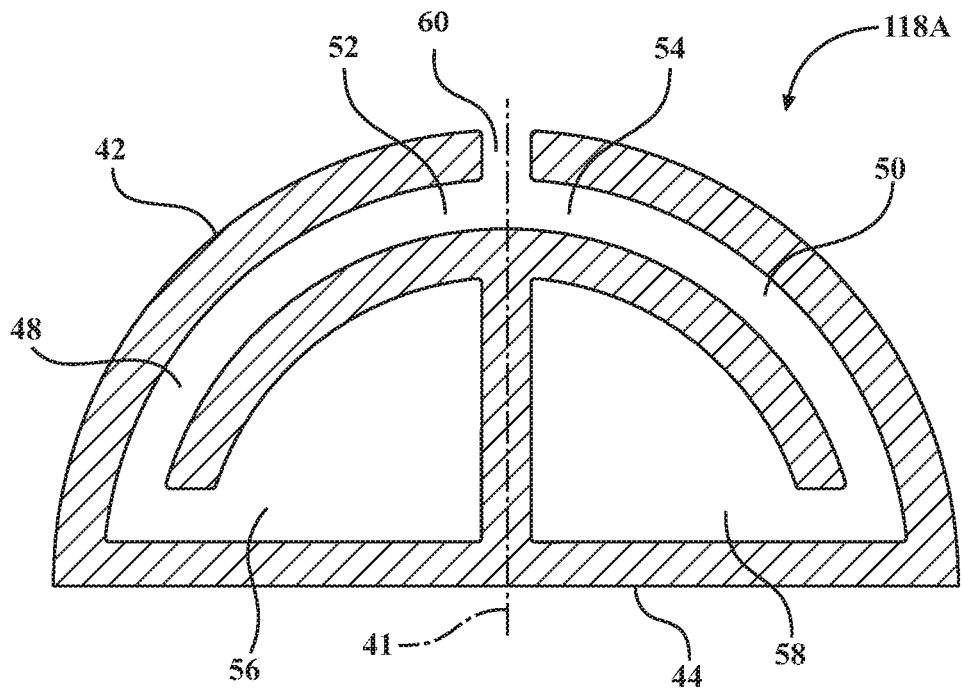
FIGS. 3A and 3B illustrate a more detailed view of an acoustic scatterer that form parts of the sound absorbing structure of FIG. 1.

The acoustic scatterer 18 of FIG. 1 can take any one of a number of different forms. For example, FIG. 3A illustrates a cross-sectional view of one example of an acoustic scatterer 118A generally taken along lines 3-3 of the acoustic scatterer 18 of FIG. 1. This is just but one example of the design of the acoustic scatterer 118A. Here, the acoustic scatterer 118A is generally in the shape of a half-cylinder. The half-cylinder shape of the acoustic scatterer 118A includes a substantially semicircular portion 42 and a substantially flat portion 44. The substantially flat portion 44 may be attached to the wall 12 shown in FIG. 1. Additionally, as stated before, the acoustic scatterer 118A and the wall 12 shown in FIG. 1 may be a unitary structure or may be connected to each other using the previously mentioned methodologies. It should be understood that the semicircular portion 42 may take any one of a number of different shapes. These shapes may be non-planar, but any suitable shape may be utilized.

The acoustic scatterer 118A may be made of any one of several different materials. Like before, the acoustic scatterer 118A may be made from an acoustically hard material, such as metal, concrete, glass, plastic, wood, and the like.

The overall shape of the acoustic scatterer 118A is substantially uniform along the length of the acoustic scatterer 118A. In this example, the acoustic scatterer 118A may include a first channel 48 that has an open end 52 and a terminal end 56. The acoustic scatterer 118A may also include a second channel 50 that has an open end 54 and a terminal end 58. The open ends 52 and 54 may be in fluid communication with an opening 60 formed on the semicircular portion 42 of the acoustic scatterer 118A. As such, the opening 60 may be directly adjacent to the open end 52 and/or the open end 54. The opening 60 may be adjacent to a line of symmetry 41 of the acoustic scatterer 118A. As to the terminal ends 56 and 58, these ends are separated from each other and are not in fluid communication with each other. The terminal ends 56 and 58 may terminate in any one of a number of different shapes. Moreover, the terminal ends 56 and 58 may terminate in the form of a chamber or may terminate in the form of a closed off channel.

The channels 48 and 50 may have a circumferential type shape that generally follows the circumference defined by the semicircular portion 42. The opening 46 may have a width that is substantially similar to the width of the channels 48 and 50. However, the widths of the channels may vary considerably.

The acoustic scatterer 118A may have a line of symmetry 41. As such, in this example, the shape of the first channel 48 is essentially a mirror image of the second channel 50. In addition, the volumes of the channels 48 and 50 may be substantially equal. "Substantially equal" in this disclosure should be understood to indicate approximately a 10% difference in the overall volume or shape of the channels 48 and 50. The resonant frequency of the channel(s) may be the same.

It should be understood that the number of channels, the shape of the channels can vary from application to application. In this example described, the acoustic scatterer 118A has two channels—channels 48 and 50. However, more or fewer channels may be utilized. In the case of multiple channels, the additional channels may have a similar shape to each other with the same channel cross-section area and length and the same cavity volume, similar to the channels 48 and 50 shown.

Figure 3B:
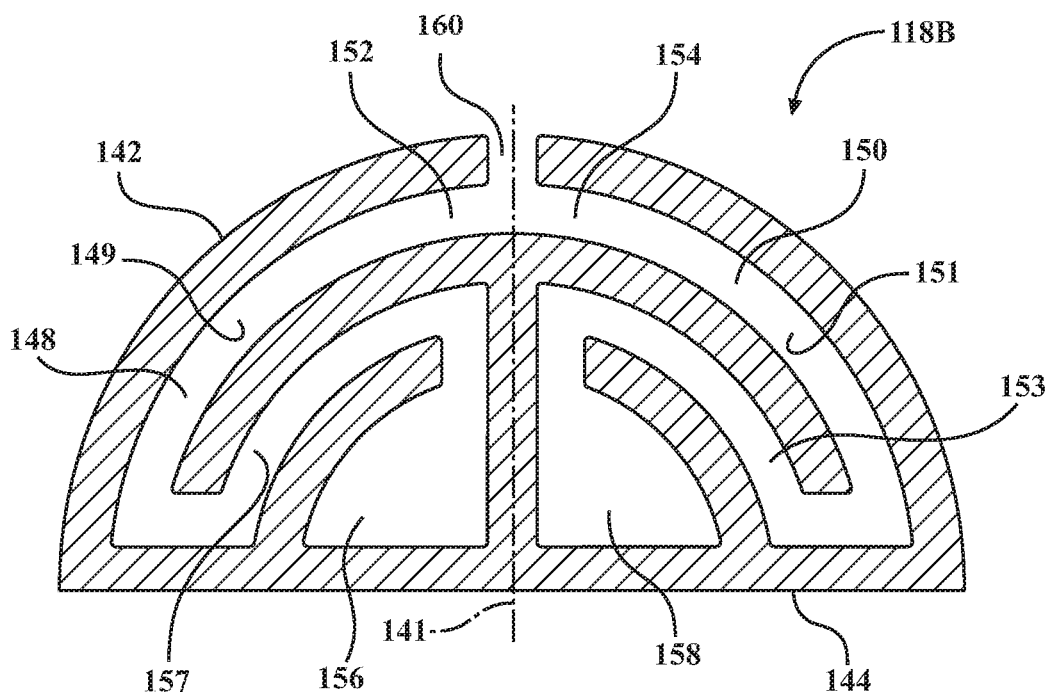

As stated before, the acoustic scatterers 118A of FIG. 1 can take any one of several different shapes. FIG. 3B illustrates another example of an acoustic scatterer 118B. Here, the acoustic scatterer 118B includes a first channel 148 and a second channel 150. Both the first and second channels 148 and 150 have open ends 152 and 154, respectively. Also, the first and second channels 148 and 150 have terminal ends 156 and 158, respectively. The open ends 152 and 154 of the channels 148 and 150 may be in fluid communication with the opening 160 generally formed on the outer circumference 142 of the acoustic scatterer 118B. The opening 160 may be adjacent to a line of symmetry 141 of the acoustic scatterer 118B. The terminal ends 156 and 158 may be in the form of a chamber or may be in the form of a closed off channel.

Like before, the flat side 144 may be attached to the first side 14 of the wall 12 by any one of several different methodologies mention. Additionally, like before, the acoustic scatterer 118B and the wall 12 may be a unitary structure.

In this example, the channel 148 is essentially a zigzag channel. Moreover, the channel 148 includes a first channel 149 and a second channel 157 that generally are parallel to one another and may have similar arcs. The second channel 150 is similar in that it has a first channel 151 and a second channel 153 that generally run parallel to each other and may have similar arcs. However, anyone of several different designs can be utilized.

The acoustic scatterer 118B may also have a line of symmetry 141. As such, the first channel 148 may essentially be a mirror image of the second channel 150. Likewise, the volume of the first channel 148 may be substantially equal to the volume of the second channel 150.

Figure 4A:
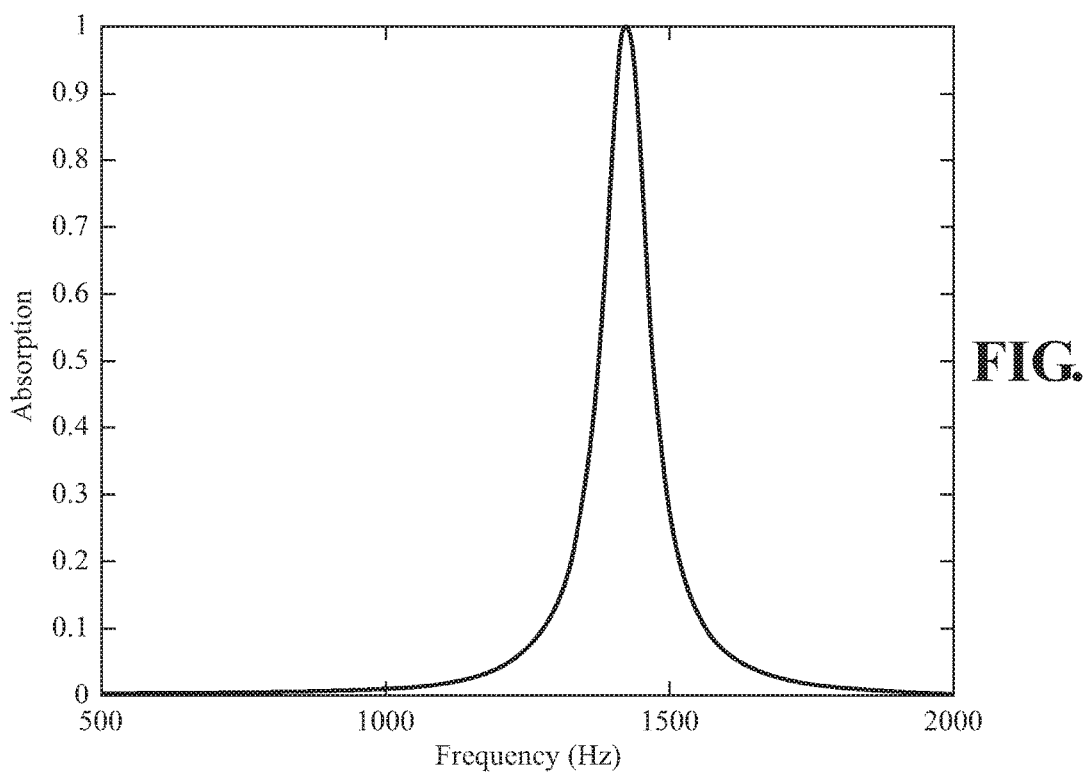
FIGS. 4A and 4B show graphs that illustrate the absorption and sound transmission loss of the acoustic scatterer under normal incidence.
Figure 4B:
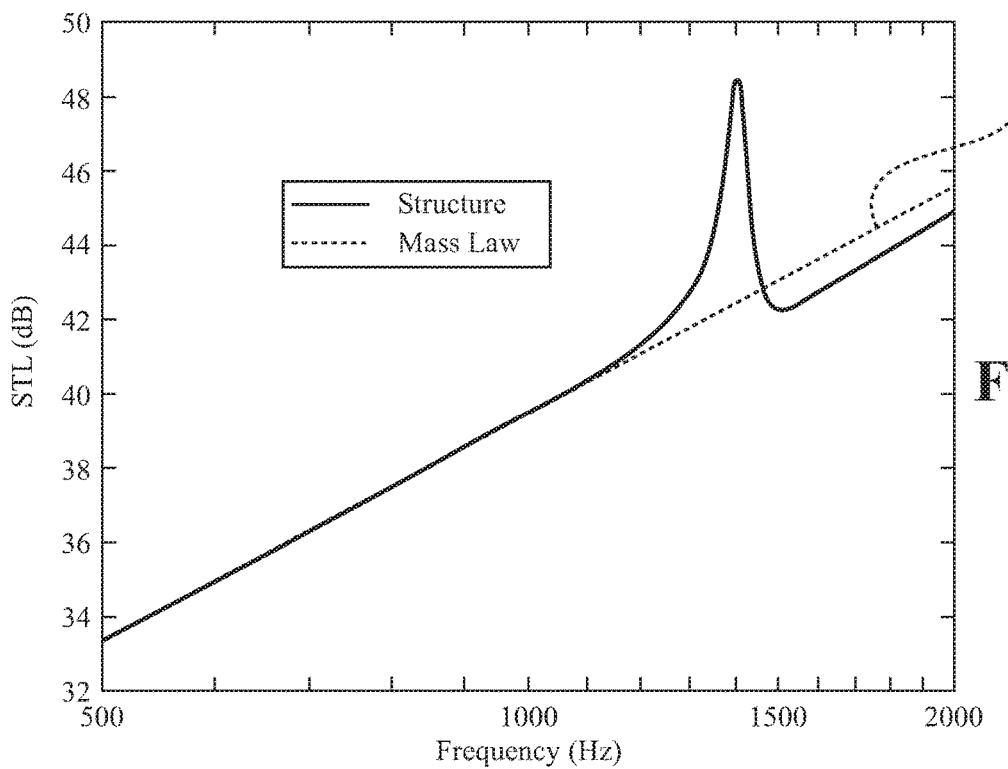

Referring to FIGS. 4A and 4B, illustrated are graphs indicating the absorption coefficient and the STL loss for a sound absorbing structure, similar to the sound absorbing structure 10 of FIG. 1. The acoustic scatterers utilized in this example may be similar to the acoustic scatterer shown and described in FIG. 3A. The sound absorbing structure in this example may have a wall made from silica glass that is 4.76 mm thick with a 0.76 mm thick dampening layer. The acoustic scatterers in this example form an array and may be made from silica glass and fabricated using 3D printing. Additionally, it may be beneficial to make the acoustic scatterer using materials with large stiffness to density ratio as it helps to eliminate the transmission loss dip near the STL peak at the resonant frequency.

The acoustic scatterer in this example has a resonant frequency of 1418 Hz, with a radius of the structure of the acoustic scatterer being 1.4 cm. The optimal center-to-center distance between the acoustic scatterers may be 10.7 cm. The structure has total absorption at 1418 Hz and shows improved STL beyond the mass law near that frequency. As best shown in FIG. 4A, the absorption coefficient indicating the total amount of absorption reaches near or even total absorption at 1418 Hz. With regards to FIG. 4B, the STL is much higher and is essentially able to break the mass-law, which is indicated as dotted line 70.

Figure 5A:
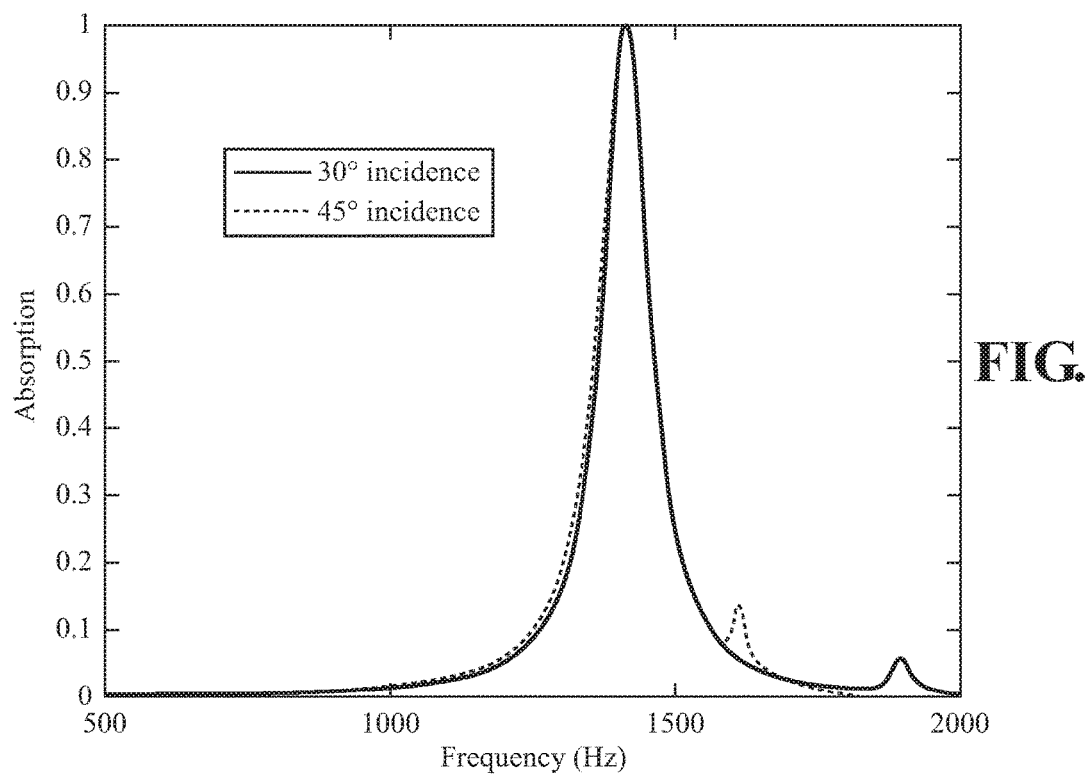
FIGS. 5A and 5B show graphs that illustrate the absorption and sound transmission loss of the acoustic scatterer at different angles of incidence.
Figure 5B:
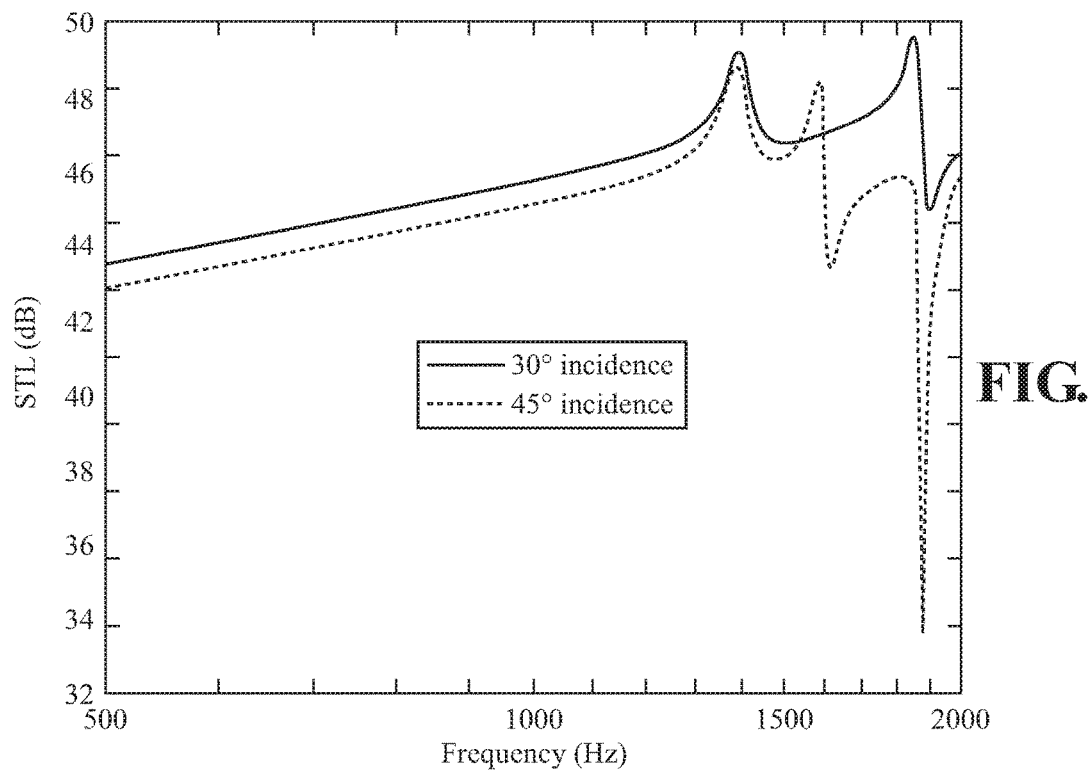

The absorption performance of a material is usually incident angle dependent. The sound absorbing structure and acoustic scatterers disclosed in this disclosure operate over a relatively wide range of incidence. Moreover, as best shown in FIGS. 5A and 5B, the oblique incidence results are shown. Total absorption can still be achieved for 30-degree and 45-degree incidence. The STL performance still shows dips near the total absorption frequency. However, high order diffraction modes will start to propagate with the increase of the incident angle. This phenomenon will change the absorption performance. When the high order diffraction modes exist at the scatterer resonant frequency, and the incident angle is sufficiently large, then the material cannot achieve total absorption. The disclosed design is tunable so that the spacing between acoustic scatterers can be reduced, and hence increase the working angle.

Figure 6A:
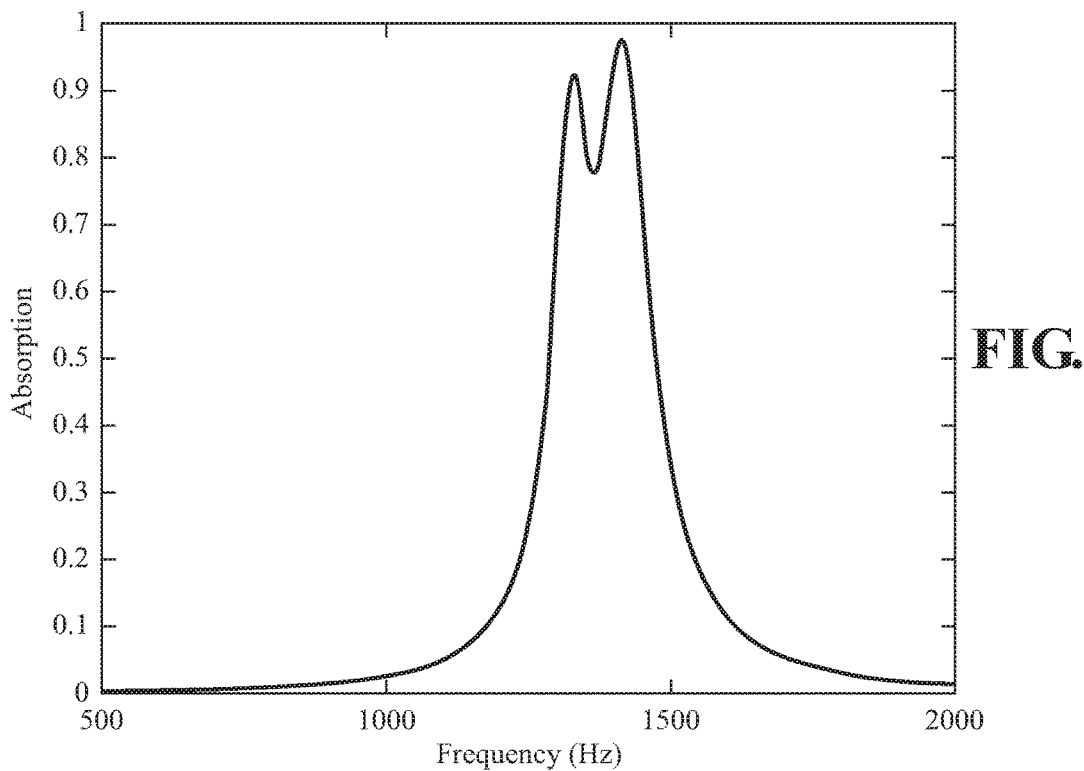
FIGS. 6A and 6B show graphs that illustrate the absorption and sound transmission loss when utilizing acoustic scatterers having different resonant frequencies.
Figure 6B:
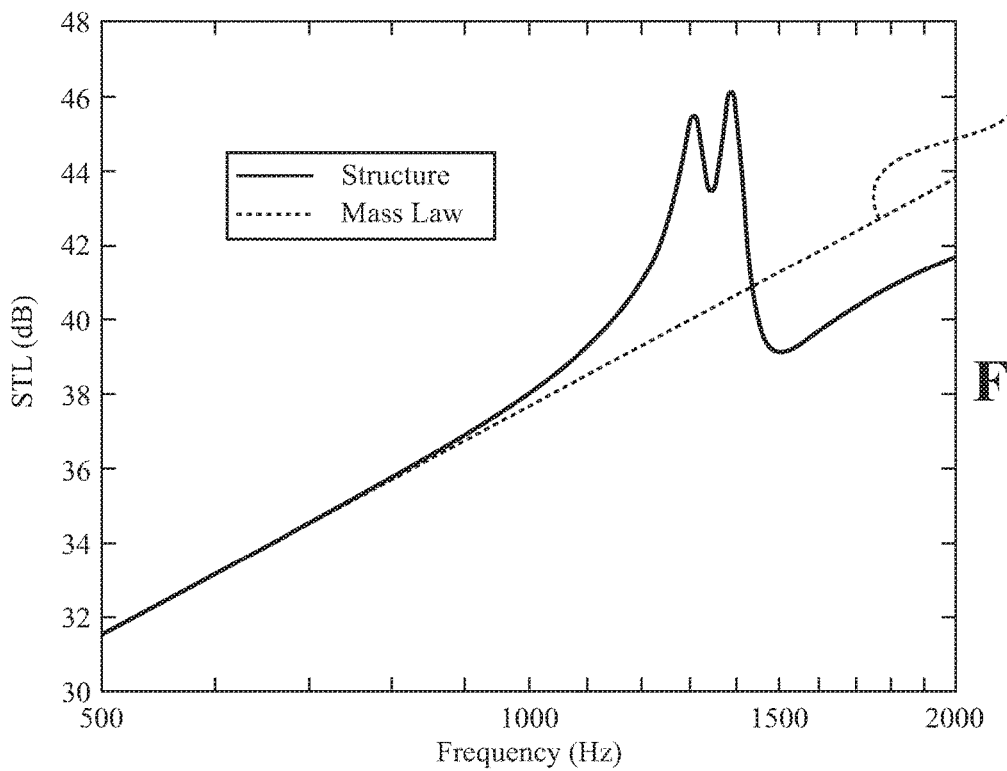
Figure 7A:
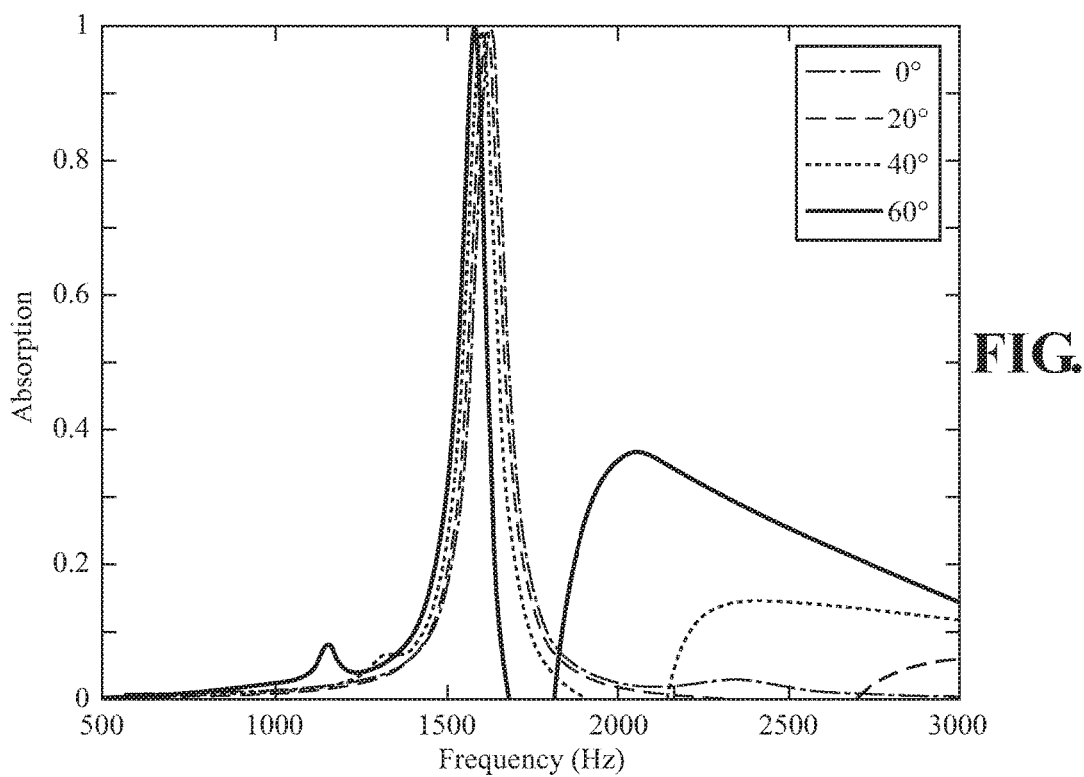
FIGS. 7A and 7B show graphs that illustrate the absorption when utilizing two different types of acoustic scatterers at different angles of incidence.
Figure 7B:
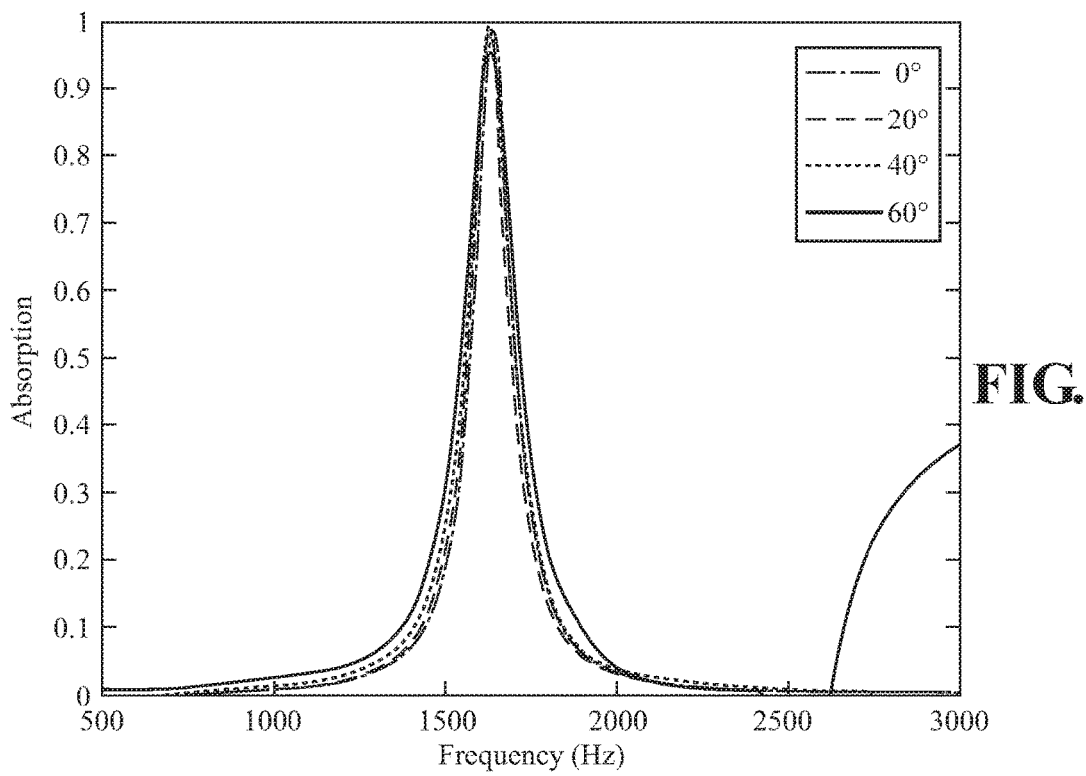

Another benefit of the acoustic scatterer design disclosed in this disclosure is that the acoustic scatterers are separated from each other, so there may be ample space to combine one design with another to cover more frequencies. For example, acoustic scatterers with different resonant frequencies can be utilized to absorb and improve STL across a wider range of frequencies. For example, FIGS. 6A and 6B illustrate the result of a sound absorbing structure that includes two different types of scatterers, one type of scatterer having a resonant frequency of 1418 Hz and another type of scatterer having a resonant frequency of 1332 Hz. The scatterers both utilize a similar optimal distance. The acoustic scatterer has a resonant frequency of 1332 Hz and has a radius of 1.45 cm. The resonant frequency is tuned by adjusting the size of the acoustic scatterer and the channel and/or cavity, as well as the width and length of the air channel. These two acoustic scatterer designs are then combined to achieve broadband performance. As shown in FIGS. 7A and 7B, though the highest absorption at two resonant frequencies are both less than unity, the high absorption bandwidth is much wider than a single scatterer.

The space between the acoustic scatterers that form the array can also be tuned. The benefit of tunable spacing is that one can choose between sparsity and the working angle of the material. By reducing the space, the performance of the device will be less sensitive to the incident angle of the wave. For example, FIGS. 7A and 7B compare the two designs of the acoustic scatterers in FIGS. 3A and 3B, respectively. The acoustic resonators in both examples have similar resonant frequencies but different spacing. The design of FIG. 7A has a spacing of 10.7 cm, while the design of FIG. 7B has a spacing of 7.5 cm. The design with more internal structures (the design illustrated in FIG. 3B) has bigger radiation impedance, and hence have a smaller optimal spacing for total absorption. It obvious that at 60-degree incidence, the 7.5 cm design works up 2.5 kHz while the 10.7 cm design shows a physically impossible absorption 1.75 kHz (<0).

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should also be understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A sound absorbing structure comprising:
a wall having a first side and a second side, the first side of the wall being positioned to face a source of a noise;
at least one acoustic scatterer coupled to a first side of the wall, the at least one acoustic scatterer having a resonant frequency;
the at least one acoustic scatterer having an opening, a first channel and a second channel;
the first channel has a first channel open end and a first channel terminal end, the first channel open end being in fluid communication with the opening;
the second channel has a second channel open end and a second channel terminal end, the second channel open end being in fluid communication with the opening;
the first channel terminal end and the second channel terminal end are separate from one another; and
wherein the first channel and the second channel extend parallelly along the length of the at least one acoustic scatterer.

2. The sound absorbing structure of claim 1, wherein the at least one acoustic scatterer has a flat side, the flat side being coupled to the first side of the wall.

3. The sound absorbing structure of claim 2, wherein the at least one acoustic scatterer has a non-planar side, the non-planar side having the opening, the non-planar side substantially facing the source of the noise.

4. The sound absorbing structure of claim 3, wherein the at least one acoustic scatterer has a half-cylinder shape, the half-cylinder shape defining the non-planar side and the flat side.

5. The sound absorbing structure of claim 1, wherein the first channel and the second channel are shaped in a zigzag design.

6. The sound absorbing structure of claim 1, wherein a thickness of the sound absorbing structure has a thickness of approximately 1/16 of a wavelength of a sound wave absorbed by the sound absorbing structure.

7. The sound absorbing structure of claim 1, wherein the at least one acoustic scatterer comprises a plurality of acoustic scatters.

8. The sound absorbing structure of claim 7, wherein the plurality of acoustic scatters includes a first scatterer having a first resonant frequency and a second scatterer having a second resonant frequency.

9. The sound absorbing structure of claim 1, wherein the sound absorbing structure is configured to absorb sound waves at a certain frequency generated by the source of the noise, wherein the certain frequency is substantially similar to the resonant frequency of the at least one acoustic scatterer.

10. The sound absorbing structure of claim 9, wherein the sound absorbing structure is configured to absorb sound waves generated by the source of the noise and projected towards the sound absorbing structure at an incidence angle substantially between 0 degrees and 45 degrees.

11. The sound absorbing structure of claim 10, wherein:
the at least one acoustic scatterer includes a plurality of acoustic scatterers separate from each other by a distance; and
wherein the incidence angle of the sound waves absorbed by the sound absorbing structure varies based on a distance between a plurality of acoustic scatterers.

12. The sound absorbing structure of claim 11, the incidence angle of the sound waves absorbed by the sound absorbing structure increases as a distance between the plurality of acoustic scatterers decreases.

13. The sound absorbing structure of claim 1, wherein the wall is made of a rigid material.

14. The sound absorbing structure of claim 1, wherein the first side of the wall faces a highway.

15. The sound absorbing structure of claim 1, wherein the first side of the wall faces a runway of an airport.

16. A system from reducing noise generated by one or more vehicles, the system comprising;
a surface that supports the one or more vehicles;
a wall adjacent to and extending along a length of the surface, the wall having a first side and a second side, the first side faces towards the surface;
at least one acoustic scatterer coupled to a first side of the wall, the at least one acoustic scatterer having a resonant frequency;
the at least one acoustic scatterer having an opening, a first channel and a second channel;
the first channel has a first channel open end and a first channel terminal end, the first channel open end being in fluid communication with the opening;
the second channel has a second channel open end and a second channel terminal end, the second channel open end being in fluid communication with the opening;
the first channel terminal end and the second channel terminal end are separate from one another; and
wherein the first channel and the second channel extend parallelly along the length of the at least one acoustic scatterer.

17. The system of claim 16, wherein the at least one acoustic scatterer has a flat side and a non-planar side, the flat side being coupled to the first side of the wall and the non-planar side having the opening.

18. The system of claim 16, wherein the one or more vehicles are at least one of aircraft, watercraft, motor vehicles, and railed vehicles.

19. The sound absorbing structure of claim 1, wherein the first and second channel terminal ends each form separate chambers.

20. The system of claim 16, wherein the first and second channel terminal ends each form separate chambers.

* * * * *